(12) United States Patent
Li et al.

(10) Patent No.: US 12,175,721 B1
(45) Date of Patent: Dec. 24, 2024

(54) MULTI-ANGLE IMAGE SEMANTIC SEGMENTATION METHOD FOR CADMIUM ZINC TELLURIDE CHIPS

(71) Applicants: Beijing Jiaotong University, Beijing (CN); Taiyuan University of Science and Technology, Taiyuan (CN); Shanxi Zhishi Haotai Technology Co., LTD, Taiyuan (CN)

(72) Inventors: Peihao Li, Beijing (CN); Huihui Bai, Beijing (CN); Yunchao Wei, Beijing (CN); Yao Zhao, Beijing (CN); Anhong Wang, Beijing (CN); Jiapeng Jia, Beijing (CN)

(73) Assignees: Beijing Jiaotong University, Beijing (CN); Taiyuan University of Science and Technology, Taiyuan (CN); Shanxi Zhishi Haotai Technology Co., LTD, Taiyuan (CN)

( * ) Notice: Subject to any disclaimer, the term of this patent is extended or adjusted under 35 U.S.C. 154(b) by 0 days.

(21) Appl. No.: 18/816,849

(22) Filed: Aug. 27, 2024

(30) Foreign Application Priority Data

Aug. 31, 2023 (CN) .......................... 202311112314.6

(51) Int. Cl.
*G06V 10/00* (2022.01)
*G06T 7/00* (2017.01)
(Continued)

(52) U.S. Cl.
CPC ............ *G06V 10/26* (2022.01); *G06T 7/0004* (2013.01); *G06V 10/141* (2022.01);
(Continued)

(58) Field of Classification Search
CPC .... G06V 10/26; G06V 10/141; G06V 10/774; G06V 10/82; G06V 20/70; G06T 7/0004;
(Continued)

(56) References Cited

U.S. PATENT DOCUMENTS

2022/0120698 A1* 4/2022 Norman ............... G01N 23/083
2022/0215662 A1* 7/2022 Yang ................... G06F 18/2155

FOREIGN PATENT DOCUMENTS

CN 113658188 A 11/2021
CN 113673529 A 11/2021
(Continued)

OTHER PUBLICATIONS

First Office Action issued in counterpart Chinese Patent Application No. 202311112314.6, dated Jun. 21, 2024.
(Continued)

*Primary Examiner* — Ping Y Hsieh
(74) *Attorney, Agent, or Firm* — Westbridge IP LLC

(57) ABSTRACT

Disclosed is a multi-angle image semantic segmentation method for cadmium zinc telluride chips, belonging to the field of image quality augmentation. Firstly, construction of an n+1 dataset is performed by using acquire CZT images, and then pixel-level and latent-level knowledge representation is performed through a Pixel Aggregation Network PAN and a Latent Aggregation Network LAN in a Progressive Complementary Knowledge Aggregation network PCKA, which ultimately improves the quality and speed of CZT image segmentation. The method is suitable for applications that require multi-angle image acquisition and semantic segmentation, such as semiconductor material segmentation.

5 Claims, 5 Drawing Sheets

(51) Int. Cl.
*G06V 10/141* (2022.01)
*G06V 10/26* (2022.01)
*G06V 10/774* (2022.01)
*G06V 10/82* (2022.01)
*G06V 20/70* (2022.01)

(52) U.S. Cl.
CPC ............ *G06V 10/774* (2022.01); *G06V 10/82* (2022.01); *G06V 20/70* (2022.01); *G06T 2207/20081* (2013.01); *G06T 2207/20084* (2013.01); *G06T 2207/30148* (2013.01)

(58) Field of Classification Search
CPC . G06T 2207/20081; G06T 2207/20084; G06T 2207/30148
See application file for complete search history.

(56) References Cited

FOREIGN PATENT DOCUMENTS

| CN | 114155481 A | 3/2022 |
|---|---|---|
| CN | 115205672 A | 10/2022 |
| CN | 116246065 A | 6/2023 |

OTHER PUBLICATIONS

Jiang et al., Granticle segmentation based on semantic feature extraction, Science of China: Information Science, vol. 50, No. 1, pp. 109-127, dated Jan. 20, 2020.

Li et al., Leaf segmentation based on semantic segmentation and visible spectroscopy, Spectroscopy and spectral Analysis, vol. 43, No. 4, pp. 1248-1253, dated Apr. 30, 2023.

Notification to Grant Patent Right for Invention issued in counterpart Chinese Patent Application No. 202311112314.6, dated Jul. 17, 2024.

Zhou et al., Semantic segmentation of images based on deep feature fusion, Computer Science, vol. 47, No. 2, pp. 126-134, Dec. 31, 2020.

* cited by examiner a                               b

| FEM | DPM | CONV | PAN | LAN† | LAN | mIoU (%) |
|-----|-----|------|-----|------|-----|----------|
| ✓ | ✓ | ✓ |  |  |  | 89.4 |
| ✓ | ✓ | ✓ | ✓ |  |  | 93.7 |
| ✓ | ✓ | ✓ | ✓ | ✓ |  | 95.1 |
| ✓ | ✓ | ✓ | ✓ |  | ✓ | 95.6 (PCKA) |

Fig. 6

| Methods | | IoU | | | mIoU(%) | FLPOS(T) | Times(s) |
|---|---|---|---|---|---|---|---|
| | | Bg | Cd | De | | | |
| U-Net | +Avg | 99.8 | 84.0 | 55.9 | 79.9 | 1.93 | 0.06 |
| | +Concat | 99.8 | 88.1 | 63.0 | 83.6 | 1.94 | 0.36 |
| | +Late Fusion | 99.8 | 97.1 | 90.1 | 95.7 | 23.11 | 8.78 |
| | +PCKA | 99.8 | 97.1 | 89.8 | 95.6 | 14.07 | 0.2 |
| CCNet | +Avg | 99.8 | 86.9 | 60.0 | 82.2 | 2.75 | 1.53 |
| | +Concat | 99.8 | 87.4 | 60.8 | 82.7 | 2.77 | 1.26 |
| | +Late Fusion | 99.8 | 96.8 | 89.0 | 95.2 | 33.05 | 11.73 |
| | +PCKA | 99.8 | 96.8 | 89.0 | 95.2 | 14.90 | 3.06 |
| PSPNet | +Avg | 99.7 | 88.3 | 62.1 | 83.4 | 2.55 | 0.06 |
| | +Concat | 99.8 | 89.8 | 63.8 | 84.5 | 2.57 | 0.37 |
| | +Late Fusion | 99.8 | 97.2 | 90.2 | 95.7 | 30.66 | 10.19 |
| | +PCKA | 99.8 | 97.1 | 89.1 | 95.3 | 14.70 | 0.2 |
| Deeplabv3 | +Avg | 99.8 | 85.1 | 57.5 | 80.8 | 2.42 | 0.06 |
| | +Concat | 97.8 | 80.7 | 65.9 | 81.5 | 2.43 | 0.37 |
| | +Late Fusion | 99.8 | 96.8 | 89.1 | 95.2 | 29.07 | 9.61 |
| | +PCKA | 99.8 | 97.0 | 89.3 | 95.4 | 14.56 | 0.2 |
| Deeplabv3Plus | +Avg | 99.8 | 86.6 | 60.7 | 82.4 | 2.43 | 0.06 |
| | +Concat | 99.8 | 88.6 | 62.9 | 83.8 | 2.44 | 0.36 |
| | +Late Fusion | 99.8 | 97.4 | 91.3 | 96.2 | 29.11 | 9.61 |
| | +PCKA | 99.8 | 97.0 | 89.5 | 95.5 | 14.57 | 0.2 |

Fig. 7 step 1) construction of an n+1 dataset:
acquiring single-camera multi-angle CZT images $I_1, I_2, ..., I_n$ by using an acquisition system, manually selecting an image with the highest recognition of monocrystal and heterocrystal defect boundaries from the n images as an image to be labeled, and marking a monocrystal area, a heterocrystal area and a background area of the CZT image by using labeling software to generate pixel-level semantic labels step 2) construction and training of a Progressive Complementary Knowledge Aggregation network PCKA:
network structure
the PCKA including a Pixel Aggregation Network PAN and a Latent Aggregation Network LAN, feeding the multi-angle images $I_1, I_2, ..., I_n$ in step 1) into the PAN to obtain pixel-level aggregated images $A_{pixel}$, then feeding the pixel-level aggregated images $A_{pixel}$ and the multi-angle images $I_1, I_2, ..., I_n$ into the LAN respectively through a feature embedding module FEM to obtain a defect semantic graph based on a general latent expression $A_{latent}$;
network training
inputting the acquired single-camera multi-angle CZT images into the PCKA for training, n multi-angle CZT images being used as an input of a training dataset of a system, one labeled image and labeled data thereof being used as network output true values

Fig. 9

MULTI-ANGLE IMAGE SEMANTIC SEGMENTATION METHOD FOR CADMIUM ZINC TELLURIDE CHIPS

CROSS-REFERENCE TO RELATED APPLICATIONS

This application claims priority to Chinese Patent Application No. 202311112314.6, filed on Aug. 31, 2023, the content of which is incorporated herein by reference in its entirety.

TECHNICAL FIELD

The present disclosure herein belongs to the technical field of image segmentation methods, and in particular relates to a multi-angle image semantic segmentation method for cadmium zinc telluride chips.

BACKGROUND

Cadmium zinc telluride (CdZnTe, CZT) is a strategically significant third-generation semiconductor material, mainly composed of three elements including tellurium, zinc, and cadmium. Its crystal structure belongs to a sphalerite structure, its adjustable bandgap width is wide, its energy gap width is about 1.57 eV, and it is a wide-forbidden-band semiconductor material. Due to its excellent chemical stability and optoelectronic properties, CZT has a wide range of applications in medical imaging, safety testing, nuclear radiation detection, and other fields. However, due to the different growth periods of various elements in CZT, CZT crystals are prone to useless heterocrystals due to lattice damage, which will affect the optoelectronic properties of useful monocrystals. Therefore, it is necessary to cut off heterocrystals. At present, CZT monocrystals and heterocrystals are cut manually. Due to the harm caused to the human body by long-term exposure to CT crystals, and the low efficiency and subjectivity of traditional manual recognition and cutting methods, the present disclosure conducts research on automatic cutting vision technology for CZT crystals based on image segmentation, aiming to use the automated cutting technology to solve the problems of manual cutting.

In recent years, semantic segmentation methods based on deep learning have achieved excellent results in many machine vision tasks. For example, Tong Zhen et al. improved the U-Net network to achieve the segmentation of standing tree images, effectively improving the accuracy of standing tree segmentation. However, this method is only applicable to standing tree images under specific lighting conditions. Under situations where the lighting is too bright or too dark, using this method will lead to significant errors. Gu Shiju et al. improved the U-Net network to achieve segmentation of muzzle flames, but due to factors such as muzzle flame sample labeling, the segmentation accuracy of the model is not high, and there are still problems such as inaccurate flame edge contours. Chen Tianhua et al. improved Deeplabv3 to achieve semantic segmentation of remote sensing images. Although this method can complete image segmentation, there are still errors in segmentation results at edges, and boundary segmentation results in some areas are still relatively blurry. The above methods provide ideas for the segmentation of monocrystals and heterocrystals of CZT. However, they are all designed and optimized for specific tasks and scenarios. Due to the complexity of CZT images, applying these methods simply and directly will lead to poor segmentation results and weak model robustness.

SUMMARY

The purpose of the present disclosure is to, by using the reflective characteristics of CZT crystals and combining with deep learning, provide a multi-angle CZT image acquisition method, a multi-angle image dataset construction method, and a CZT image semantic segmentation deep neural network model based on a multi-angle latent aggregation network, so as to ultimately improve the quality and speed of CZT image segmentation.

In order to achieve the above purpose, the present disclosure is implemented by adopting the following technical solution: multi-angle image semantic segmentation method for cadmium zinc telluride chips, including:

step 1) construction of an n+1 dataset:

acquiring single-camera multi-angle CZT images $I_1, I_2, \ldots, I_n$ by using an acquisition system, manually selecting an image with the highest recognition of monocrystal and heterocrystal defect boundaries from the n images as an image to be labeled, and marking a monocrystal area, a heterocrystal area and a background area of the CZT image by using labeling software to generate pixel-level semantic labels;

step 2) construction and training of a Progressive Complementary Knowledge Aggregation network PCKA:

network structure the PCKA including a Pixel Aggregation Network PAN and a Latent Aggregation Network LAN, feeding the multi-angle images $I_1, I_2, \ldots, I_n$ in step 1) into the PAN to obtain pixel-level aggregated images $A_{pixel}$, then feeding the pixel-level aggregated images $A_{pixel}$ and the multi-angle images $I_1, I_2, \ldots, I_n$ into the LAN respectively through a feature embedding module FEM to obtain a defect semantic graph based on a general latent expression A latent;

network training inputting the acquired single-camera multi-angle CZT images into the PCKA for training, n multi-angle CZT images being used as an input of a training dataset of a system, one labeled image and labeled data thereof being used as network output true values.

Further, in step 1), the acquisition system is composed of one industrial camera and n angle light sources, and acquiring images includes:

step 1.1: adjusting the focal length of the camera;

step 1.2: turning on the n angle light sources, optimizing and adjusting light brightness, and acquiring the multi-angle CZT images according to formula (1):

$$I_i = k_{ambient}{}^i L_{ambient}{}^i + k_{diffuse}{}^i L_{diffuse}{}^i (h^i \cdot l^i) + k_{specular}{}^i L_{specular}{}^i (r^i \cdot v)^{\alpha^i}$$

$$r^i = 2(h^i \cdot l^i) h^i - l^i, i=1,2,\ldots,n \tag{1}$$

where $I_i$ represents an image acquired when an ith angle light source is lighted up solely, n represents the total number of multi-angle light sources, $L_{ambient}{}^i$, $L_{diffuse}{}^i$ and $L_{specular}{}^i$ respectively represent ith angle ambient lighting, diffuse lighting and specular lighting, $k_{ambient}$, $k_{diffuse}$ and $k_{specular}$ respectively represent reflection coefficients corresponding to ambient lighting, diffuse lighting and specular lighting, h represents the normal direction of a corresponding point of incidence, l represents an incident light direction vector, r represents a reflection direction vector, α represents surface roughness, and v represents the direction of the camera.

Further, a specific data processing process of the PAN includes:

feeding the multi-angle images $I_1, I_2, \ldots, I_n$ into a U-shaped weight calibrator to obtain corresponding weights $w_1, w_2, \ldots, w_n$, and expressing an encoder and a decoder in the calibrator respectively as PE and PDE, this process being expressed as:

$$O_1 = PE_1(Cat(I_1, I_2, \ldots, I_n))$$

$$O_i = PE_i(O_{i-1}), i=2, \ldots, 5 \qquad (2)$$

where Cat(•) represents a splicing operation, $PE_i$ represents an ith encoding layer in the calibrator, and $O_i$ represents an output of the ith encoding layer in the calibrator;

$$O'_1 = PDE_1(O_5)$$

$$O'_i = PDE_i(Cat(O'_{i-1}, O_{5-(i-1)})), i=2, \ldots, 5 \qquad (3)$$

where $PDE_i$ represents an ith decoding layer in the PAN and $O'_i$ represents an output of the ith decoding layer in the PAN;

finally obtaining n weights $w_1, w_2, \ldots, w_n$ corresponding to $I_1, I_2, \ldots, I_n$, then obtaining calibrated images $I'_i$ (i=1, ..., n) according to $I_i * w_i$, and finally obtaining pixel-level aggregated images $A_{pixel}$ through $$\sum_{i=1}^{n} I'_i.$$

Further, the LAN includes Forward Extraction Modules FEMs, Augmentation Guide Modules AGM and a Deep Projection Module DPM, the FEMs are configured to obtain feature expressions of $I_1, I_2, \ldots, I_n$ and $A_{pixel}$, the AGMs are configured to adaptively extract latent clues under the guide of $A_{pixel}$, the DPM is configured to project aggregated features to a deeper feature space to obtain the general latent expression $A_{latent}$ to finally obtain a semantic graph based on $A_{latent}$.

Further, a specific process of the FEMs includes:

given $I_i$ (i=1, ..., n) and $A_{pixel}$, using three convolutional layers, one pooling layer and first three residual blocks of ResNet-101 as a shallow layer extractor, which is expressed as:

$$x_\alpha = Down(f(I_\alpha)), I_\alpha \in \{I_i, A_{pixel}\} \qquad (4)$$

where f(•) represents a latent feature extraction function, Down(•) represents a maximum pooling operation, and $x_\alpha$ represents an output latent feature of $I_\alpha$ and is fed into first three modules of ResNet-101 to further extract latent residual features;

expressing required bottom layer mapping as $H(x_\alpha)$, and fitting another mapping by using several nonlinear layers:

$$F(x_\alpha) = H(x_\alpha) - x_\alpha \qquad (5)$$

where F(•) represents stacked convolutional layers, till which latent residual features generated by original mapping $F(x_\alpha) + x_\alpha$ are obtained as an input of a subsequent module.

Further, a specific process of the AGMs includes using $x_{pixel}$ to guide, from a latent space, unique boundary clues coming from $x_i$ (i=1, ..., n), that is, aggregating supplementary knowledge beneficial to segmentation, and suppressing useless redundant information:

$$L_i = \sigma(g_1(g_2(Cat(x_i, x_{pixel})))) \times x_i \qquad (9)$$

$$L' = \sum_{i=1}^{n} L_i$$

where $g_1(\cdot)$ and $g_2(\cdot)$ are implementable by using convolutional layers, σ represents a Sigmoid function, $L_i$ represents latent features extracted from $I_1, \ldots, I_n$, and L' represents an aggregated complementary feature.

Further, a specific process of the DPM includes projecting L' to a deeper feature space to obtain a deep latent feature $A_{latent}$ in a case that an output L' of the AGMs is known, which is expressed as:

$$A_{latent} = D_3(D_2(D_1(L'))) \qquad (7)$$

where $D_1(\cdot)$, $D_2(\cdot)$ and $D_3(\cdot)$ are implementable by using subsequent residual blocks of ResNet-101.

Compared with the traditional image methods, the present disclosure has the following innovative points and advantages.

Firstly, the present disclosure adopts a single-camera multi-angle acquisition mode aiming at the multi-angle reflection characteristics of CZT crystals. This acquisition mode not only avoids the errors caused by multi-camera image registration, but also can fuse different boundary information from images from different lighting angles.

Secondly, the present disclosure proposes an n+1 dataset construction mode for CZT image segmentation. This dataset is composed of high-resolution and high-precision multi-angle CZT images and pixel-level semantic labels thereof, and provides a benchmark dataset for other industrial tasks that require information fusion to assist image analysis.

Lastly, the present disclosure also proposes a segmentation network based on multi-angle complementary knowledge aggregation aiming at CZT image segmentation. This network achieves the effect of adaptively aggregating boundary information from both pixel-level and feature-level information. The present disclosure is suitable for applications that require multi-angle image acquisition and semantic segmentation, such as semiconductor material segmentation.

BRIEF DESCRIPTION OF THE DRAWINGS

FIG. 6 illustrates ablation experiment data of each component of a PCKA based on U-Net according to the present disclosure.

FIG. 7 illustrates a data graph of comparisons between a method according to the present disclosure and different solutions.

FIG. 9 illustrates a multi-angle image semantic segmentation method for cadmium zinc telluride chips.

DETAILED DESCRIPTION OF THE EMBODIMENTS

The present disclosure will be further described below in detail in combination with the embodiments with reference to the drawings.

Referring to FIG. 9, a multi-angle image semantic segmentation method for cadmium zinc telluride chips includes the following steps:

Step 1) construction of an n+1 dataset

Figure 1:
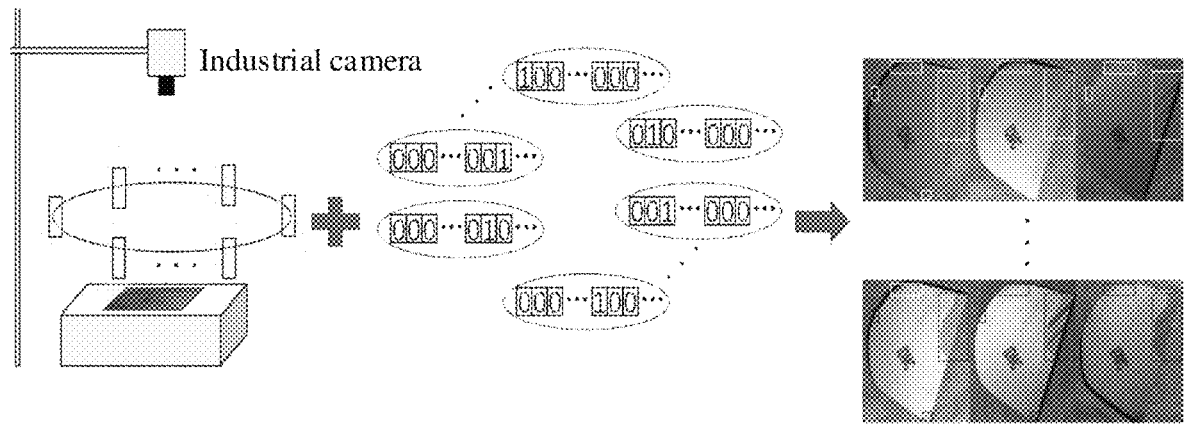
FIG. 1 illustrates a schematic diagram of single-camera multi-angle lighting control.

Single-camera multi-angle CZT images $I_1, I_2, \ldots, I_n$ are acquired by using an acquisition system. Referring to FIG. 1, the acquisition system is composed of one industrial camera and n angle light sources, and acquiring images includes the following steps:

In step 1.1, the focal length of the camera is adjusted.

In step 1.2, the n angle light sources are turned on, light brightness is optimized and adjusted, and the multi-angle CZT images are acquired according to formula (1):

$$I_i = k_{ambient}{}^i L_{ambient}{}^i + k_{diffuse}{}^i L_{diffuse}{}^i (h^i \cdot l^i) + k_{specular}{}^i L_{specular}{}^i (r^i \cdot v)^\alpha$$

$$r^i = 2(h^i \cdot l^i) h^i - l^i, i=1,2,\ldots,n \qquad (1)$$

where $I_i$ represents an image acquired when an ith angle light source is lighted up solely, n represents the total number of multi-angle light sources, $L_{ambient}{}^i$, $L_{diffuse}{}^i$ and $L_{specular}{}^i$ respectively represent ith angle ambient lighting, diffuse lighting and specular lighting, $k_{ambient}$, $k_{diffuse}$ and $k_{specular}$ respectively represent reflection coefficients corresponding to ambient lighting, diffuse lighting and specular lighting, h represents the normal direction of a corresponding point of incidence, l represents an incident light direction vector, r represents a reflection direction vector, $\alpha$ represents surface roughness, and v represents the direction of the camera.

Figure 2:
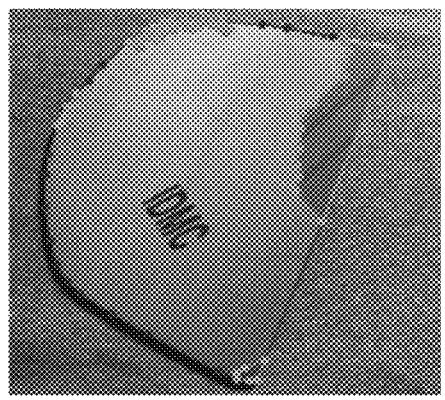
FIG. 2 illustrates a schematic diagram of data labeling, where a of FIG. 2 is a labeling process, b of FIG. 2 is a generated labeled image, a dark area represents CZT monocrystal, a light area represents heterocrystal, and a black area represents background.
Figure 2:
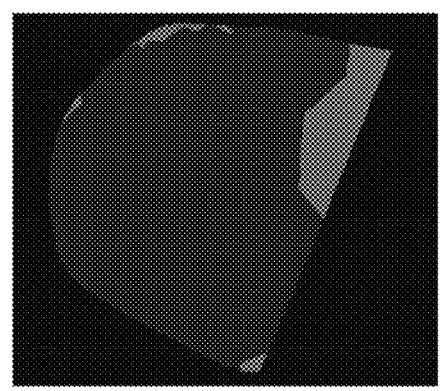

Then, an image with the highest recognition of monocrystal and heterocrystal defect boundaries is manually selected from the n images as an image to be labeled, and a monocrystal area, a heterocrystal area and a background area of the CZT image are marked by using labeling software to generate a pixel-level semantic graph, as illustrated in FIG. 2.

Figure 3:
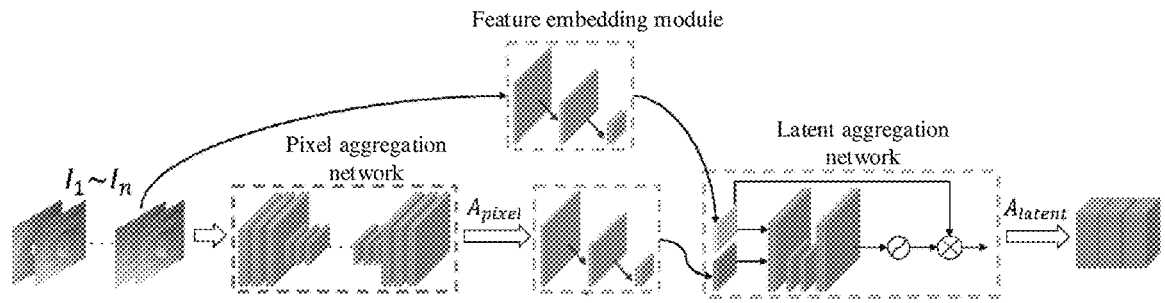
FIG. 3 illustrates a schematic diagram of a Progressive Complementary Knowledge Aggregation network PCKA.

Step 2) construction and training of a Progressive Complementary Knowledge Aggregation network PCKA Network Structure Referring to FIG. 3, the PCKA includes a Pixel Aggregation Network PAN and a Latent Aggregation Network LAN. The multi-angle images $I_1, I_2, \ldots, I_n$ in step 1) are fed into the PAN to obtain pixel-level aggregated images $A_{pixel}$. Then the pixel-level aggregated images $A_{pixel}$ and the multi-angle images $I_1, I_2, \ldots, I_n$ are fed into the LAN respectively through a feature embedding module (FEM) to obtain a defect semantic graph based on a general latent expression $A_{latent}$.

Figure 4:
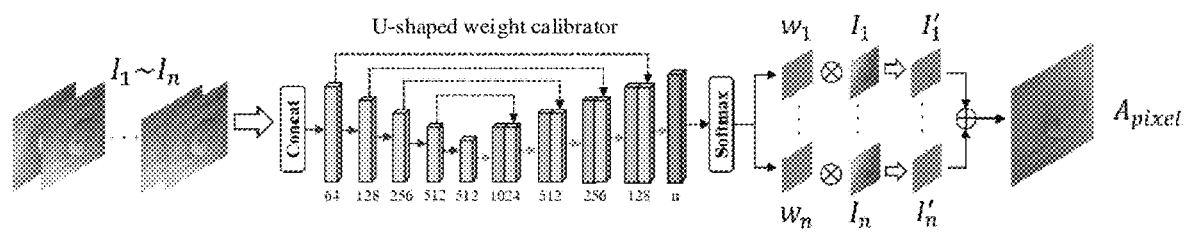
FIG. 4 illustrates a schematic diagram of a Pixel Aggregation Network PAN.

Referring to FIG. 4, a specific data processing process of the PAN includes the following steps.

The multi-angle images $I_1, I_2, \ldots, I_n$ are fed into a U-shaped weight calibrator to obtain corresponding weights $w_1, w_2, \ldots, w_n$. An encoder and a decoder in the calibrator are respectively expressed as PE and PDE. This process is expressed as:

$$O_1 = PE_1(Cat(I_1, I_2, \ldots, I_n))$$

$$O_i = PE_i(O_{i-1}), i=2,\ldots,5 \qquad (2)$$

where $Cat(\bullet)$ represents a splicing operation, $PE_i$ represents an ith encoding layer in the calibrator, and $O_i$ represents an output of the ith encoding layer in the calibrator;

$$O'_1 = PDE_1(O_5)$$

$$O'_i = PDE_i(Cat(O'_{i-1}, O_{5-(i-1)})), i=2,\ldots,5 \qquad (3)$$

where $PDE_i$ represents an ith decoding layer in the PAN and $O'_i$ represents an output of the ith decoding layer in the PAN.

Finally, n weights $w_1, w_2, \ldots, w_n$ corresponding to $I_1, I_2, \ldots, I_n$ are obtained. Then, calibrated images $I'_i$ (i=1, ..., n) are obtained according to $I_i * w_i$. Finally, pixel-level aggregated images $A_{pixel}$ are obtained through $$\sum_{i=1}^{n} I'_i.$$

Figure 5:
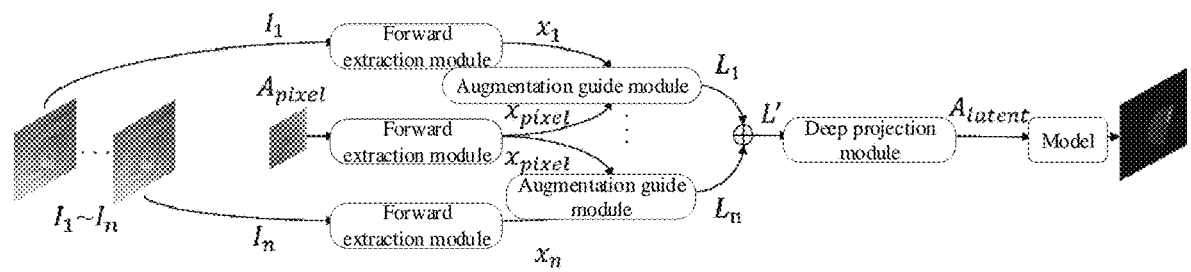
FIG. 5 illustrates a schematic diagram of a Latent Aggregation Network LAN.

Referring to FIG. 5, the LAN includes Forward Extraction Modules FEMs, Augmentation Guide Modules AGMs and a Deep Projection Module DPM. The FEMs are configured to obtain feature expressions of $I_1, I_2, \ldots, I_n$ and $A_{pixel}$. The AGMs are configured to adaptively extract latent clues under the guide of $A_{pixel}$. The DPM is configured to project aggregated features to a deeper feature space to obtain the general latent expression $A_{latent}$ to finally obtain a semantic graph based on $A_{latent}$.

A specific process of the FEMs includes the following steps.

Given $I_i$ (i=1, ..., n) and $A_{pixel}$, three convolutional layers, one pooling layer and first three residual blocks of ResNet-101 are used as a shallow layer extractor, which is expressed as:

$$x_\alpha = Down(f(I_\alpha)), I_\alpha \in \{I_j, A_{pixel}\} \qquad (4)$$

where $f(\bullet)$ represents a latent feature extraction function, $Down(\bullet)$ represents a maximum pooling operation, and $x_\alpha$ represents an output latent feature of $I_\alpha$ and is fed into first three modules of ResNet-101 to further extract latent residual features.

Required bottom layer mapping is expressed as $H(x_\alpha)$. Another mapping is fit by using several nonlinear layers:

$$F(x_\alpha) = H(x_\alpha) - x_\alpha \qquad (5)$$

where $F(\bullet)$ represents stacked convolutional layers, till which latent residual features generated by original mapping $F(x_\alpha) + x_\alpha$ are obtained as an input of a subsequent module.

A specific process of the AGMs includes the following steps.

$x_{pixel}$ is used to guide, from a latent space, unique boundary clues coming from $x_i$ (i=1, ..., n), that is, supplementary knowledge beneficial to segmentation is aggregated, and useless redundant information is suppressed:

$$L_i = \sigma(g_1(g_2(Cat(x_i, x_{pixel})))) \times x_i \quad (9)$$

$$L' = \sum_{i=1}^{n} L_i$$

where $g_1(\cdot)$ and $g_2(\cdot)$ are implementable by using convolutional layers, $\sigma$ represents a Sigmoid function, $L_i$ represents latent features extracted from $I_1, \ldots, I_n$, and L' represents an aggregated complementary feature.

A specific process of the DPM includes the following steps.

L' is projected to a deeper feature space to obtain a deep latent feature A latent in a case that an output L' of the AGMs is known, which is expressed as:

$$A_{latent} = D_3(D_2(D_1(L'))) \quad (7)$$

where $D_1(\cdot)$, $D_2(\cdot)$ and $D_3(\cdot)$ are implementable by using subsequent residual blocks of ResNet-101.

Network Training

The acquired single-camera multi-angle CZT images are input into the PCKA for training. N multi-angle CZT images are used as an input of a training dataset of a system. One labeled image and labeled data thereof are used as network output true values.

Simulation experiments were conducted below on the multi-angle image semantic segmentation method for cadmium zinc telluride chips according to the present disclosure.

Experimental Setup

Our deep learning algorithm run on Ubuntu20.04LTS operating system. A CPU i9-10900X 3.7 GHZ, 16 GB memory, and two Quadro RTX 8000GPU with a 48 GB video memory were used. We selected ImageNet pretrained ResNet-101 as a backbone network. Training images were randomly scaled (0.75 to 2.0). Then, resulting images were randomly cropped to a size of 768×768. All experiments were conducted by using a small-batch stochastic gradient descent method. We adopted a poly learning rate adjustment strategy, where the initial learning rate was multiplied by $$1 - \left(\frac{iter}{max\_iter}\right) power,$$

where power=0.9. We used momentum 0.9 and weight decay 0.0001. The initial learning rate of the pixel aggregation network was 1e−3. The initial learning rate of the latent aggregation network was 1e−2. All experimental results in the present disclosure were obtained after 40000 iterations for training.

Ablation Experiment

In FIG. 6, we conducted ablation studies on each component of PCKA based on U-Net. Specifically, we used a first convolutional layer of ResNet-101 as a feature extractor (weight sharing) to projected bottom layer pixels into a latent space, abbreviated as CONV, and set CONV as our baseline. We input $A_{pixel}$ into a deep network, abbreviated as PAN. In addition, we aggregated $x_{i,2}, \ldots, x_{i,12}$ and $x_{pixel,2}$, which was denoted as LAN*, to demonstrate the effectiveness of feature-level information aggregation. Finally, we equipped the AGMs onto the LAN to use $A_{pixel}$ to guide information aggregation, abbreviated as LAN. FIG. 6 validates the effectiveness of each component on the n+1 dataset. We set CONV as our baseline.

It can be seen that PAN, when compared with the baseline, can bring good gain results, indicating that pixel-level information aggregation is necessary for 12-angle images. By performing feature-level aggregation on $x_{i,2}, \ldots, x_{i,12}$ and $x_{pixel,2}$, the performance was further improved by 1.4% in LAN*, indicating that the aggregated latent clues can provide performance gains. For the last row (PCKA) in FIG. 6, we demonstrate that the solution of pixel-level and feature-level clue aggregation results in mIoU improvement of 0.5%, thus validating the effectiveness of LAN.

Comparison with Different Solutions

FIG. 7 illustrates a performance comparison between different solutions. Bg, Cd and De respectively refer to background, monocrystal and heterocrystal. In FIG. 7, we conducted comprehensive experiments by using different learning frameworks on the n+1 dataset, so as to show the effectiveness and efficiency of PCKA. In order to meet the actual application demands, the reasoning time was obtained through calculation on actual deployed devices (individual Geforce RTX 3060).

Specifically, 1) images from 12 different angles can be directly aggregated (averaged and cascaded) at the pixel level to aggregate pixel-level information, abbreviated as Avg and Concat, respectively; 2) we randomly selected an image during each iteration of the training phase to train the model. During the testing phase, images from 12 different angles were predicted to obtain 12 different segmentation results. Then, we fused these results for model integration, abbreviated as Late Fusion.

Obviously, all methods have achieved excellent performance in category "Bg", indicating that for CdZnTe images, segmentation algorithms can easily distinguish between foreground and background. Therefore, the key issue in defect segmentation of CdZnTe crystals is how to adaptively extract clues that are beneficial for distinguishing the boundaries of "Cd" and "De".

It can be seen that there is a significant gap between pixel-level methods (Avg and Concat) and other solutions, indicating that if we treat images from 12 angles equally, it is difficult for deep models to directly learn boundary information. Due to the powerful model integration capability of Late Fusion and the effective information aggregation capability of PCKA, both frameworks have achieved excellent performance. However, Late Fusion requires a significant amount of computing resources when integrating models, resulting in longer processing time and unacceptable performance in real-world industrial scenarios, leading to less than ideal results. In short, only our PCKA has achieved satisfactory results in both time and segmentation performance.

Further, this patent studied the performance of Late Fusion and PCKA under different numbers of input images. We only input images into Late Fusion and PCKA based on specific lighting angles.

Figure 8:
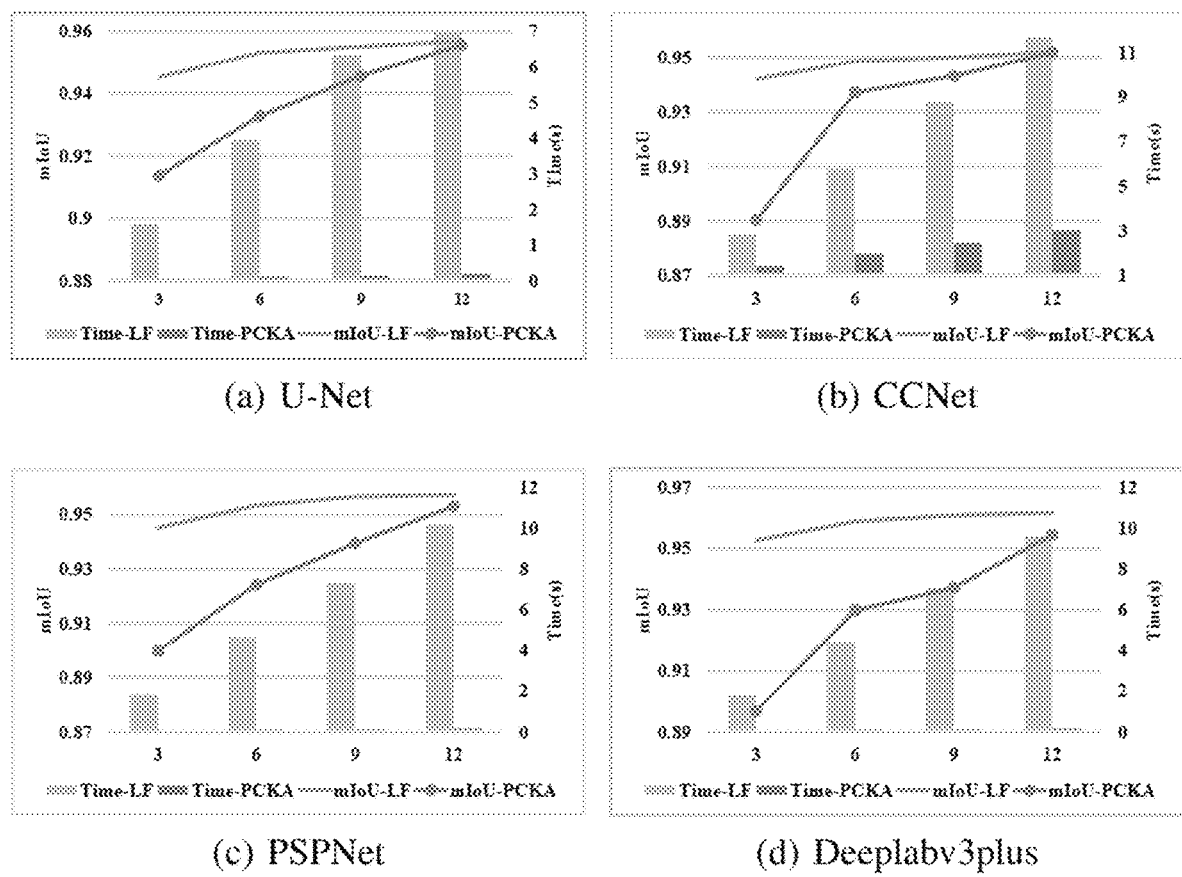
FIG. 8 illustrates a performance comparison between 12-angle images from specific lighting angles.

FIG. 8 illustrates a performance comparison between 12-angle images from specific lighting angles (the curve in the image cannot be distinguished after grayscale transformation, please modify it). LF represents Late Fusion. The primary Y-axis represents mIoU, and the secondary Y-axis represents reasoning time.

For the different segmentation models in FIG. 8, although Late Fusion outperforms our PCKA, it requires longer time to integrate more models compared to our PCKA. In addition, when the number of input images is 12, our PCKA achieves competitive performance while ensuring reasoning speed.

It can be seen that our PCKA can gather beneficial clues at the pixel and feature levels, rather than relying on model integration, which results in consistent performance gains compared to Late Fusion as the number of input images increases. It can be seen that our PCKA can effectively extract useful boundary clues from different images. On the contrary, Late Fusion exhibits a "performance saturation effect" as the number of input images increases. It consumes a significant amount of reasoning time in all cases, which is unacceptable in practical applications.

What are described above are only specific embodiments of the present disclosure, but the scope of protection of the present disclosure is not limited to thereto. Any changes or replacements that can be easily thought of by those skilled in the art within the technical scope disclosed in the present disclosure should be included in the scope of protection of the present disclosure. Therefore, the scope of protection of the present disclosure should be subject to the scope of protection of the claims.

What is claimed is:

1. A multi-angle image semantic segmentation method for cadmium zinc telluride chips, comprising:

step 1) construction of an n+1 dataset:

acquiring single-camera multi-angle Cadmium Zinc Telluride (CZT) images $I_1, I_2, \ldots, I_n$ by using an acquisition system, manually selecting an image with the highest recognition of monocrystal and heterocrystal defect boundaries from n images as an image to be labeled, and marking a monocrystal area, a heterocrystal area and a background area of the CZT image by using labeling software to generate pixel-level semantic labels;

step 2) construction and training of a Progressive Complementary Knowledge Aggregation network (PCKA):

network structure the PCKA comprising a Pixel Aggregation Network (PAN) and a Latent Aggregation Network (LAN), feeding the multi-angle images $I_1, I_2, \ldots, I_n$ in step 1) into the PAN to obtain pixel-level aggregated images $A_{pixel}$, then feeding the pixel-level aggregated images $A_{pixel}$ and the multi-angle images $I_1, I_2, \ldots, I_n$ into the LAN respectively through a Feature Embedding Module (FEM) to obtain a defect semantic graph based on a general latent expression $A_{latent}$;

a specific data processing process of the PAN comprising:

feeding the multi-angle images $I_1, I_2, \ldots, I_n$ into a U-shaped weight calibrator to obtain corresponding weights $w_1, w_2, \ldots, w_n$, and expressing an encoder and a decoder in the calibrator respectively as PE and PDE, this process being expressed as:

$$O_1 = PE_1(Cat(I_1, I_2, \ldots, I_n))$$

$$O_i = PE_i(O_{i-1}), i=2, \ldots, 5 \quad (2)$$

where Cat(•) represents a splicing operation, $PE_i$ represents an ith encoding layer in the calibrator, and $O_i$ represents an output of the ith encoding layer in the calibrator;

$$O'_1 = PDE_1(O_5)$$

$$O'_i = PDE_i(Cat(O'_{i-1}, O_{5-(i-1)})), i=2, \ldots, 5 \quad (3)$$

where $PDE_i$ represents an ith decoding layer in the PAN and $O'_i$ represents an output of the ith decoding layer in the PAN;

finally obtaining n weights $w_1, w_2, \ldots, w_n$ corresponding to $I_1, I_2, \ldots, I_n$, then obtaining calibrated images $I'_i$ (i=1, \ldots, n) according to $I_i * w_i$, and finally obtaining pixel-level aggregated images $A_{pixel}$ through $$\sum_{i=1}^{n} I'_i;$$

the LAN comprising Forward Extraction Modules (FEMs), Augmentation Guide Modules (AGMs) and a Deep Projection Module (DPM), the FEMs being configured to obtain feature expressions of $I_1, I_2, \ldots, I_n$, $A_{pixel}$, the AGMs being configured to adaptively extract latent clues under the guide of $A_{pixel}$, and the DPM being configured to project aggregated features to a deeper feature space to obtain the general latent expression $A_{latent}$ to finally obtain a semantic graph based on $A_{latent}$;

network training inputting the acquired single-camera multi-angle CZT images into the PCKA for training, n multi-angle CZT images being used as an input of a training dataset of a system, one labeled image and its labeled data thereof being used as network output true values.

2. The multi-angle image semantic segmentation method for cadmium zinc telluride chips according to claim 1, wherein in step 1), the acquisition system is composed of one industrial camera and n angle light sources, and acquiring images comprises:

step 1.1: adjusting a focal length of the camera;

step 1.2: turning on the n angle light sources, optimizing and adjusting light brightness, and acquiring the multi-angle CZT images according to formula (1):

$$I_i = k_{ambient}{}^i L_{ambient}{}^i + k_{diffuse}{}^i L_{diffuse}{}^i (h^i \cdot l^i) + k_{specular}{}^i L_{specular}{}^i (r^i \cdot v)^{\alpha^i}$$

$$r^i = 2(h^i \cdot l^i) h^i - l^i, i=1,2, \ldots, n \quad (1)$$

where $I_i$ represents an image acquired when an ith angle light source is lighted up solely, n represents the total number of multi-angle light sources, $L_{ambient}{}^i$, $L_{diffuse}{}^i$ and $L_{specular}{}^i$ respectively represent ith angle ambient lighting, diffuse lighting and specular lighting, $k_{ambient}$, $k_{diffuse}$ and $k_{specular}$ respectively represent reflection coefficients corresponding to ambient lighting, diffuse lighting and specular lighting, h represents the normal direction of a corresponding point of incidence, l represents an incident light direction vector, r represents a reflection direction vector, $\alpha$ represents surface roughness, and v represents the direction of the camera.

3. The multi-angle image semantic segmentation method for cadmium zinc telluride chips according to claim 1, wherein a specific process of the Forward Extraction Modules (FEMs) comprises:

given $I_i$ (i=1, \ldots, n) and $A_{pixel}$, using three convolutional layers, one pooling layer and first three residual blocks of ResNet-101 as a shallow layer extractor, which is expressed as:

$$x_\alpha = Down(f(I_\alpha)), I_\alpha \in \{I_i, A_{pixel}\} \quad (4)$$

where f(•) represents a latent feature extraction function, Down(•) represents a maximum pooling operation, and $x_\alpha$ represents an output latent feature of $I_\alpha$ and is fed into first three modules of ResNet-101 to further extract latent residual features;

expressing required bottom layer mapping as $H(x_\alpha)$, and fitting another mapping by using several nonlinear layers:

$$F(x_\alpha) = H(x_\alpha) - x_\alpha \quad (5)$$

where F(•) represents stacked convolutional layers, till which latent residual features generated by original mapping $F(x_\alpha)+x_\alpha$ are obtained as an input of a subsequent module.

4. The multi-angle image semantic segmentation method for cadmium zinc telluride chips according to claim 3, wherein a specific process of the Augmentation Guide Modules (AGMs) comprises using $x_{pixel}$ to guide, from a latent space, unique boundary clues coming from $x_i$ (i=1, ..., n), that is, aggregating supplementary knowledge beneficial to segmentation, and suppressing useless redundant information:

$$L_i = \sigma(g_1(g_2(Cat(x_i, x_{pixel})))) \times x_i \quad (9)$$

$$L' = \sum_{i=1}^{n} L_i$$

wherein $g_1(•)$ and $g_2(•)$ are implementable by using convolutional layers, $\sigma$ represents a Sigmoid function, $L_i$ represents latent features extracted from $I_1, \ldots, I_n$, and L' represents an aggregated complementary feature.

5. The multi-angle image semantic segmentation method for cadmium zinc telluride chips according to claim 4, wherein a specific process of the DPM comprises projecting L' to a deeper feature space to obtain a deep latent feature A latent in a case that an output L' of the AGMs is known, which is expressed as:

$$A_{latent} = D_3(D_2(D_1(L'))) \quad (7)$$

wherein $D_1(•)$, $D_2(•)$ and $D_3(•)$ are implementable by using subsequent residual blocks of ResNet-101.

\* \* \* \* \*